United States Patent [19]

Fiedler

[11] Patent Number: 4,676,538
[45] Date of Patent: Jun. 30, 1987

[54] FERTILIZER IMPLANTING TOOL

[76] Inventor: Manfred Fiedler, 8508 W. 89th St., Hickory Hills, Ill. 60457

[21] Appl. No.: 884,028

[22] Filed: Jul. 10, 1986

[51] Int. Cl.$^4$ .......................... A01B 1/16; A01B 45/02
[52] U.S. Cl. ..................................... 294/50; 294/50.7
[58] Field of Search .................. 294/50, 50.5, 50.7, 294/50.6, 50.8, 50.9, 61, 19.1; 172/19, 21, 22, 25; 30/130; 171/53; 175/20, 244; 111/4, 99

[56] References Cited

U.S PATENT DOCUMENTS

| | | | |
|---|---|---|---|
| 3,113,534 | 12/1963 | Wessel | 294/50.7 |
| 3,416,831 | 12/1968 | Bishop et al. | 294/50.5 |
| 3,506,296 | 4/1970 | Nelson | 294/50.7 |
| 4,585,072 | 4/1986 | Martinez | 294/50 |

Primary Examiner—James B. Marbert
Attorney, Agent, or Firm—Mann, McWilliams, Zummer & Sweeney

[57] ABSTRACT

A tool for implanting fertilizer spikes in the ground with a rod slidably disposed in an open ended hollow tube which is adapted to be inserted into the ground to a predetermined depth. The fertilizer spike engages the end of the slidable rod, the hollow tube and spike are pushed into the ground and the spike is expelled from the tube by actuation of the rod when the tube is removed from the ground.

3 Claims, 3 Drawing Figures

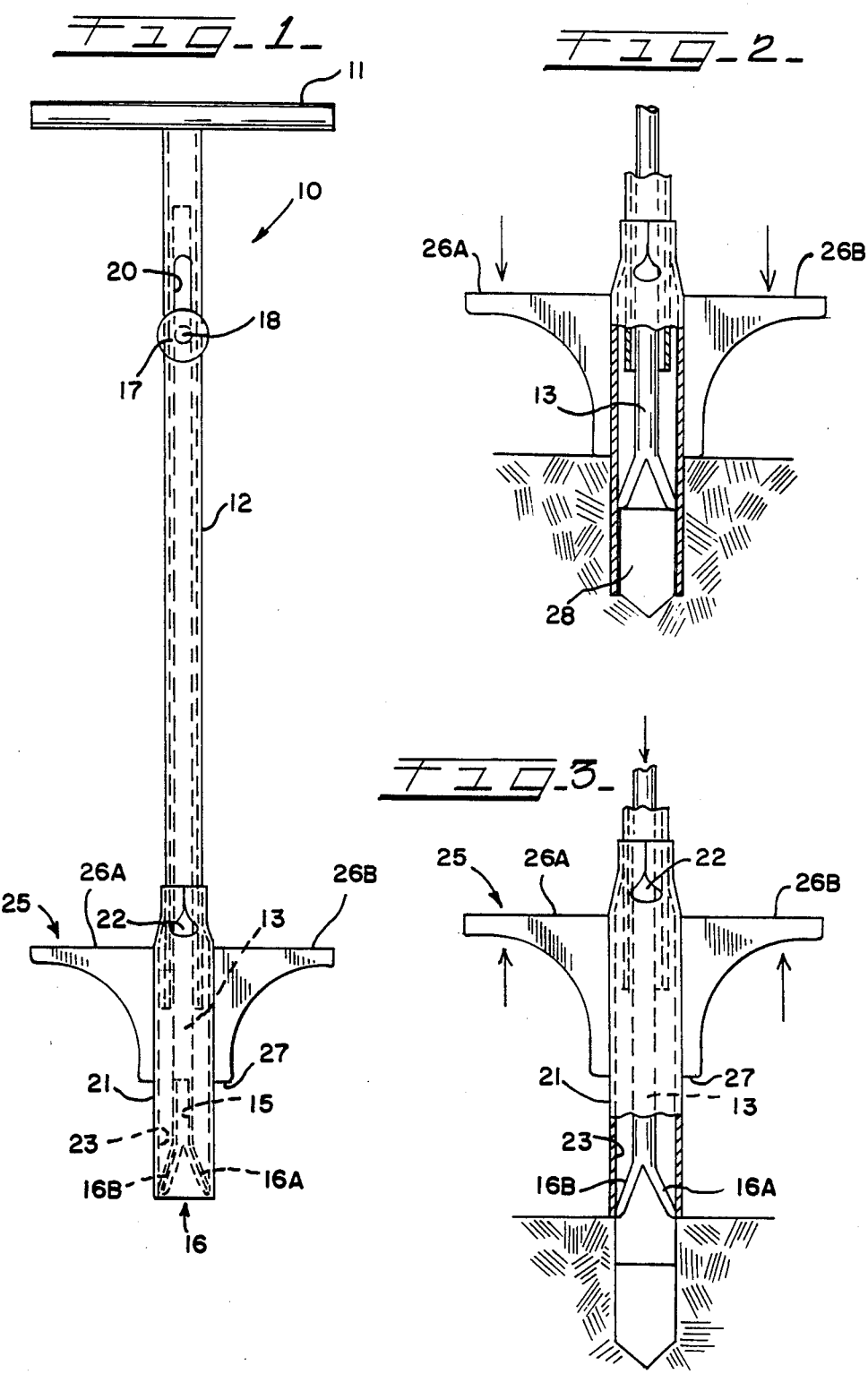

FERTILIZER IMPLANTING TOOL

BACKGROUND OF THE INVENTION

The present invention deals with the general field of gardening tools and specifically is directed to a tool for implanting fertilizer spikes in the ground. It has been known in the art to provide a combination tool which may be used selectively as a turf borer or auger or a sod cutter. Such a tool is used to first remove sod and then bore holes in the ground after which fertilizer is inserted in the form of a cartridge. Such a device shown in U.S. Pat. No. 2,028,483. The difficulty with such a tool is that the several operations which are required are quite time consuming, particularly when a number of fertilizer spikes must be implanted. Other tools which can be utilized for boring holes in the ground and/or dispensing fertilizer into the ground are shown in U.S. Pat. Nos. 772,097, 1,065,456, 4,011,612 and Des. 251,698 and Des. 253,390. None of these devices, however, provides a tool which, in a single operation, can implant a fertilizer spike into the ground and then expel the plug and inserted spike simultaneously with withdrawal of the tool from the ground.

SUMMARY OF THE INVENTION

The present invention provides a unitary tool which includes a hollow tube at the lower end adapted to be driven into the ground a predetermined depth. Positioned within the hollow tube is a fertilizer spike located at the end of a selectively slidable rod. Also located at the end of the rod is an expulsion mechanism which is effective, when the rod is moved downwardly at the same time the tube is removed from the ground, to force the spike from the tube.

DESCRIPTION OF THE DRAWINGS

FIG. 1 is a side view, partially in phantom, of the fertilizer implanting tool of the present invention.

FIG. 2 is a side view, partially in phantom, showing the lower portion of the implanting tool and a fertilizer spike which have been inserted into the ground.

FIG. 3 is a side view, partially in phantom, showing the lower portion of the implanting tool removed from the ground and the spike remaining in the ground.

DESCRIPTION OF THE PREFERRED EMBODIMENT

FIG. 1 shows a tool, generally designated as 10, which is specifically adapted for implanting fertilizer spikes into the ground. The tool consists of a handle 11 connected to the upper end of a hollow shaft 12. A rod 13 is slidably disposed within the shaft 12 and defines, at its lower end, a hollow chamber 15 and expelling means 16 in the form of a pair of angularly outwardly extending fingers 16A and 16B.

At the upper end of the rod 13, an actuating mechanism 17 is provided, shown in the form of a knob, which is connected to the rod by means of a shaft 18. A slot 20 is defined in the outer periphery of the shaft 12 which enables the rod 13 to move from its lowermost position, as shown in FIG. 1, to its uppermost position as shown in FIG. 2.

A hollow tube 21 is connected over, and concentric with, the lower end of the rod 13. The upper end of the tube 21 can be connected to the shaft 12 as by crimping or welding or any of a number of commonly accepted fastening methods. A plurality of apertures 22 are formed in the upper end of tube 21 and serve as vents to prevent the entrapment of air within the tube. The tube 21 has an inner wall 23 which is designed to lie adjacent the outer end of fingers 16A and 16B.

A transverse foot ledge 25 is shown connected to and extending from the tube 21. The ledge includes a pair of outwardly extending flanges 26A and 26B which form platforms upon which a foot may be positioned to exert a downward force in much the same manner as the upper edges of a shovel. The foot ledge 25 also includes a collar 27 which extends radially outwardly from the tube 21 and forms a stop mechanism to limit the downward travel of the hollow tube into the ground.

The operation of the present invention is as follows. When loading the tool, it is inverted from the position shown in FIG. 1. The rod 13 slides to the position illustrated in FIG. 2 in which the fingers 16A and 16B are spaced from the bottom of the open ended tube. A fertilizer spike 28, illustrated in FIG. 2, of appropriate composition for the particular soil and crop conditions, is manually inserted into the open end of the tube 21 until it engages the ends of the fingers 16A and 16B. The chamber is sized to provide a slight clearance for insertion of fertilizer spikes, which are generally of a standard dimension, approximately equal to the internal dimension of the tube 21.

Once the spike 28 has been loaded into tube 21, the tool is inverted and placed into contact with the ground with the spike disposed within the tube and with the open end of the tube surrounding the location where the spike is to be implanted. Implanting of the fertilizer spike into the ground is illustrated in FIG. 2. Force is applied downwardly on the handle and on one or both of flanges 26A and 26B by the foot of the operator. The tube 21 and the spike 28 enter the ground until collar 27 engages the ground surface at which time all substantial downward movement stops. The depth of ground penetration can be controlled by controlling the distance between the lower end of the tube 21 and the lower end of collar 27. Generally, this distance should be equal to or slightly greater than the overall length of the fertilizer spike to insure complete implantation of the spike.

During the course of implanting the spike, the earth below and around the tube 21 and spike 28 is compacted which action forces the rod 13 upwardly in the shaft 12 and causes the knob 17 to assume a position adjacent the upper end of the groove 20. The apertures 22 act as a vent and allow air to pass out of the upper end of the chamber formed in the tube 21.

The final step in the process is removal of the tool from the ground with the spike remaining implanted, as illustrated in FIG. 3. To accomplish this, the handle 11 is grasped by the operator and pulled upwardly at the same time as the knob 17 is forced downwardly. The force exerted by expelling means 16 through fingers 16A and 16B forces the fertilizer spike out of the tube 21 to remain in the ground. The ground, with the spike implanted, can then be tamped with a foot or tamping tool.

Thus, the present invention provides a fertilizer spike implanting tool which is inexpensive, easy to operate and produces satisfactory results in a substantially reduced period of time compared to prior art devices.

Various features of the invention have been particularly shown and described in connection with the illustrated embodiments of the invention, however, it must be understood that these particular arrangements merely illustrate and that the invention is to be given its fullest interpretation within the terms of the appended claims.

What is claimed is:

1. A fertilizer implanting tool including a handle disposed at the upper end, a hollow tube disposed at the lower end, a hollow shaft interconnecting said handle and said tube, one or more apertures defined in a wall of said hollow tube at the upper end thereof to vent said tube to atmosphere and to prevent entrapment of air in said tube, a rod slidably disposed within said shaft and positioned so as to move within said hollow tube, said rod adapted to assume an upper position for positioning a fertilizer spike within said tube and a lower position for expelling said spike from said tube, actuating means connected to said rod so as to allow selective positioning of said rod with respect to said shaft, a transverse foot ledge extending from said hollow tube so as to provide a platform against which the operator may exert force, and a stop mechanism disposed below and spaced from said foot ledge extending outwardly from said tube so as to limit the downward travel of said hollow tube into the ground, said tool being operable such that said hollow tube and said spike are inserted into the ground simultaneously and at the same time said tube is removed from the ground, said rod is moved to its lower position to urge said spike out of said hollow tube to remain imbedded in the ground.

2. A fertilizer implanting tool as in claim 1 in which the volume of said hollow tube is substantially equal to the volume of the fertilizer spike to be implanted.

3. A fertilizer implanting tool as in claim 1 in which said rod defines expelling means at its lower end extending outwardly from said rod into close proximity to the inner circumference of said hollow tube said expelling means defining a plurality of fingers spaced from each other extending radially outwardly from said rod adapted to engage and expel said fertilizer spike from said tube.

* * * * *